United States Patent [19]

Frey

[11] Patent Number: 4,975,699

[45] Date of Patent: Dec. 4, 1990

[54] ERROR REDUCTION METHOD AND APPARATUS FOR A DIRECT DIGITAL SYNTHESIZER

[75] Inventor: Gary D. Frey, Yorba Linda, Calif.

[73] Assignee: Hughes Aircraft Company, Los Angeles, Calif.

[21] Appl. No.: 444,494

[22] Filed: Dec. 1, 1989

[51] Int. Cl.[5] ............................................. H03M 1/06
[52] U.S. Cl. .................................. 341/118; 341/147; 364/721
[58] Field of Search ............... 341/117, 118, 144, 147; 364/607, 718, 721, 729; 328/14

[56] References Cited

U.S. PATENT DOCUMENTS 4,476,536  10/1984  Jones .................................... 364/721
4,809,205   2/1989  Freeman ............................... 364/721

Primary Examiner—William M. Shoop, Jr.
Assistant Examiner—Brian K. Young
Attorney, Agent, or Firm—Wanda K. Denson-Low

[57] ABSTRACT

A circuit for generating an analog sine voltage from a digital phase input (11) employing a memory (13) storing sine and cosine values and a correction value for each phase and first and second digital-to-analog converters (DACs) (19,21). For each digital phase input (N), selected sine and cosine values are combined and the result is read out to the first DAC (19), which generates an analog sine approximation voltage. A corresponding correction value is simultaneouosly read out to the second DAC (21), whose output is scaled by an attenuator (23) to provide a correction voltage for correcting the deviation in the output voltage of the first DAC (19) from the ideal sine voltage value.

7 Claims, 1 Drawing Sheet

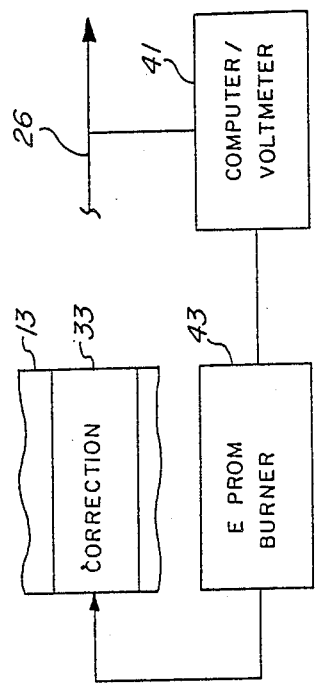
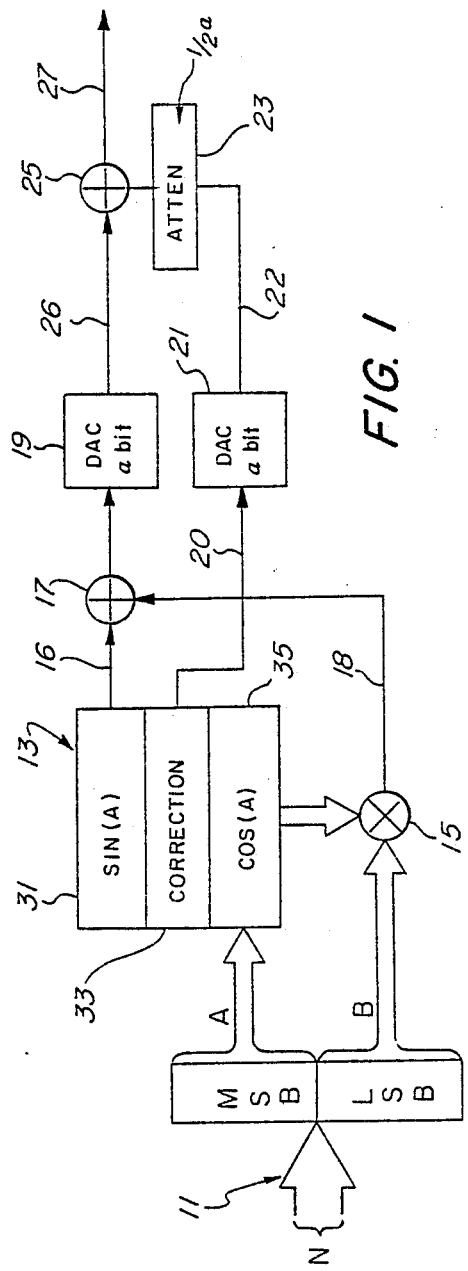
FIG. 1
FIG. 2

ERROR REDUCTION METHOD AND APPARATUS FOR A DIRECT DIGITAL SYNTHESIZER

BACKGROUND OF THE INVENTION

1. Field of the Invention

The subject invention relates generally to digital frequency synthesizer apparatus and, more particularly, to apparatus for correcting errors in such apparatus resulting from the use of a limited number of digital bits to represent an analog signal.

2. Description of Related Art

The Direct Digital Synthesizer (DDS) provides a means for achieving very fast frequency hopping in radio frequency transmitters while retaining phase coherence between transmitter and receiver. However, for several reasons, present DDS technology does not produce sinusoidal output accuracy sufficient for HF-radio requirements.

Conventional DDS circuitry employs a sine table look-up operation to output a series of digital sine approximation values and a digital-to-analog converter (DAC) to convert the digital sine approximation values to an analog output waveform. The prior art uses as many bits in the look-up table as can be accommodated by the DAC. Truncation errors result from memory limitations, including limitations on the number of memory addresses and the number of bits (size) of the memory output word. The size of presently-available DACs also contributes to error in the conventional DDS output. As a result of such errors, the present state of the art provides accuracy on the order of $-60$ dBc spurious (about 10-bit actual accuracy) with a 12-bit DAC output, whereas $-80$ dBc is required for HF radio applications. To achieve $-80$ dBc spurious output, resolution of 14-bit accuracy is required. However, DACs having 14-bit output resolution are presently unavailable.

SUMMARY OF THE INVENTION

It is therefore an object of the invention to improve direct digital synthesizers;

It is another object of the invention to increase the accuracy of direct digital synthesizers to that required for HF radio applications;

It is another object of the invention to compensate for sources of error in conventional DDS circuitry; and It is yet another object of the invention to correct truncation and DAC errors in DDS circuitry.

These and other objects of the invention are achieved by employing a method of interpolation which reduces look-up table size together with an error reduction technique employing two or more smaller, commercially-available DACs. One of the DACs generates a sine approximation output voltage, while the second DAC generates a correction voltage from a stored digital correction value. The correction voltage corrects the sine approximation output voltage for both sine approximation and DAC inaccuracies.

A major advantage of the invention is that presently-available technology may be employed to realize a low spurious output, high-speed DDS. The use of a second DAC for error correction almost doubles the bit resolution of available DACs for several orders of magnitude spurious reduction.

BRIEF DESCRIPTION OF THE DRAWING

The just-summarized invention will now be discussed in conjunction with the drawings, of which:

FIG. 1 is a schematic circuit diagram of the preferred embodiment of the invention; and FIG. 2 is a schematic diagram illustrating optional apparatus for generating correction values used in the preferred embodiment.

DESCRIPTION OF THE PREFERRED EMBODIMENTS

In FIG. 1, an N bit DDS accumulator phase output on an input line 11 is broken into A bits and B bits. The descriptors "A" and "B" derive from the sine approximation formula:

$$\sin(A + B) = \sin A \cos B + \cos A \sin B \quad (1)$$

$$\approx \sin A + B \cos A \text{ for } B << 1 \text{ radian} \quad (2)$$

In such case, "A" represents the most significant bits and "B" the least significant bits of the argument $(A+B)$.

The A and B bit sets on line 11 are supplied to circuitry including a look-up table 13, a digital multiplier 15, a digital adder 17, first and second DACs 19, 21, an analog attenuator 23, and an analog adder 25. The look-up table 13 may be a conventional read only memory (ROM), and the DACs 19, 21 may be commercially-available DACs.

The look-up table 13 is divided into three sections 31, 33, 35, each addressed by the most significant input bits A. The first section 31 stores the sine of A for a selected number of phase steps, the second section 33 stores a correction value for each of the selected number of phase steps, and the third section 35 stores the cosine of A for the selected number of phase steps.

In operation, the A input bits are input as an address to the look-up table section 31, which outputs sin (A) to a first input 16 of the digital adder 17 and cos (A) to the multiplier 15. The multiplier 15 produces the product B cos (A) and supplies it to a second input 18 of the digital adder 17. A correction value output from the correction section 33 of the look-up table 13 is supplied over a line 20 to the second DAC 21.

The second DAC 21 provides an output 22 to the analog attenuator 23. The attenuator 23 attenuates the second DAC output by the quantity $\frac{1}{2}^a$, where "a" is the bit width (size) of the first and second DACs 19, 21. The output 26 of the first DAC 19 is supplied as a first input to the analog adder 25. The second input of the analog adder 25 is the output of the attenuator 23. The output 27 of the analog adder 25 forms the output of the DDS.

To avoid prohibitive size requirements for the look-up table 13, the sine function is approximated in the preferred embodiment according to equation (2) above. In such case, for example, if $N=14$, $A=8$, and $B=6$, the sine value of only 256 phase steps need be stored in the first section 31 of the table 13. Likewise, the cosine value for only 256 phase steps need be stored in the third section 35 of the memory 13.

Truncation according to the sine approximation of equation (2), however, leads to a deviation in the DDS output from the ideal sine value. For example, if A is truncated to 10 bits, $B \leq \pi/512$, the peak error at zero radians is $\sin(\pi/512) \approx \pi/512$ or $-44.5$ dB. The memory 13 could be made large enough to output, e.g., a 14-bit-wide word necessary to reduce the peak error to the −80-dB range. Even then, however, as noted above, available DACs do not have the bit resolution necessary to accommodate a 14-bit input.

The circuitry of FIG. 1 avoids this dilemma by the use of two smaller DACs 19, 21 of commercially-available size, together with the use of correction values derived as hereafter described and stored in the correction section 33. For the 256 phase steps discussed, 256 correction values would be derived and stored.

In operation of the circuit of FIG. 1, the digital adder 17 outputs the quantity sin (A)+B cos (A) to the first DAC 19, while a correction value corresponding to the particular phase step represented by N is outputted to the second DAC 21, where it is converted to an analog output. The analog attenuator 23 provides a scale factor of $\frac{1}{2}^a$ to scale the analog output of the second DAC 21 to correct for the error in the output of the first DAC 19. The scaled output of the second DAC 21 is added to the output of the first DAC 19 by the analog adder 25 to form the DDS output.

In order to derive the appropriate correction values, the binary values for sin (A) and cos (A) are placed in the table look-up memory sections 31, 35 and an accumulator phase input is supplied on line 11 to the circuitry. The voltage at the output 27 of the adder 25 is then read and its deviation from the desired voltage value is determined. The digital correction value necessary to generate an analog voltage output from the second DAC 21 equal to the deviation is then computed and stored in the correction memory section 33. Such a measurement is made for each value of A, e.g., 256 values, and, e.g., 256 corresponding correction values are stored in the correction section 33 at appropriate addresses. A computer-controlled voltmeter 41 and an E PROM burner 43 could be used to automate such a process, as shown in FIG. 2, if desired.

As an illustration of the technique of deriving a correction value, assume the two DACs 19, 21 are each 8-bit DACs having a maximum output voltage of 1 volt, and that it is desired to generate the sine of 90 degrees at the output 27. The value for sin (A) and cos (A) stored in the memory 13 are the binary values 01111111 and 00000000, respectively, for an N-bit accumulator input of 01000000 . . . . The desired output on line 27 is sin (90)=1 volt. Further suppose that when the circuit of FIG. 1 is operated with no correction value, the actual output on line 26 is 0.998 volts, the deviation of 0.002 volts being due to truncation and DAC errors. In such case, a digital correction value is stored in the memory 13 which will cause the second DAC 21 to generate an output of 0.512 volts which, when attenuated by $\frac{1}{2}^8$ or 1/256, yields the 0.002 volts necessary to correct or compensate for the deviation.

It will be appreciated that, in operation of the circuit of FIG. 1, successive digital phase values N having components A and B are supplied on the line 11. For each phase value which addresses the memory 13, corresponding values of sin (A), cos (A) and a correction value are read out to the subsequent apparatus for generating the output value on line 27.

Various adaptations and modifications of the just-disclosed preferred embodiment will be apparent to those skilled in the art. Therefore, it is to be understood that, within the scope of the appended claims, the invention may be practiced other than as specifically described herein.

What is claimed is:

1. Circuitry for converting a digital input comprising an N bit word including A bits and B bits where A and B are integers and $A+B=N$ into a desired sine voltage, said circuitry comprising:
   a memory means addressed by said A bits, said memory means storing binary sine values, binary cosine values and binary correction values for outputting a selected sine A value, cosine A value and correction value in response to a selected address of A bits;
   means for forming a binary output comprising the expression sin (A)+B cos (A) from said selected sin (A) and cos (A) values;
   a first digital-to-analog converting means for converting said binary output to an analog sine approximation voltage exhibiting a deviation from the desired sine voltage; and
   means receiving a selected one of said correction values for generating a compensation voltage for compensating for said deviation from said desired sine voltage, said means including
   a second digital-to-analog converting means for converting said correction value to an analog correction voltage; and
   attenuation means for attenuating said analog correction voltage for generating said compensation voltage.

2. The circuitry of claim 1 further including means for adding said compensation voltage to said sine approximation voltage.

3. The circuitry of claim 2 wherein said first and second digital-to-analog converting means have a selected bit width and wherein said attenuation means attenuates said analog correction voltage by a factor of $\frac{1}{2}^a$, wherein the exponent "a" is the bit width of said second digital-to-analog converting means.

4. The circuitry of claim 3 wherein the bit width of said first analog-to-digital converting means equals the bit width of said second analog-to-digital converting means.

5. The circuitry of claim 4 wherein said means for forming comprises:
   a multiplier receiving said B bits and the selected cos (A) values and having an output; and
   an adder receiving said output of said multiplier and said selected sin (A) values and having an output connected to said first digital-to-analog converting means.

6. A method of compensating for errors in a circuit wherein digital approximations of trigonometric values are stored in a memory and used to generate a sine approximation value for supply to a digital-to-analog converter (DAC) which generates a sine approximation voltage, comprising the steps of:
   measuring the deviation of said sine approximation voltage from the desired sine voltage;
   deriving a digital correction value for compensating for said deviation;
   storing said digital correction value; and
   employing the stored digital correction value to compensate for said deviation.

7. The method of claim 6 wherein said step of employing comprises the steps of:
   converting said digital correction value to an analog voltage;
   attenuating said analog voltage; and
   adding said analog voltage to said sine approximation voltage.

* * * * *